Dec. 12, 1967              H. C. DILLON             3,358,232
CURRENT AND VOLTAGE REGULATED TESTING APPARATUS FOR MEASURING
THE IMPEDANCE CHARACTERISTICS OF COMPONENTS
Filed Oct. 5, 1962
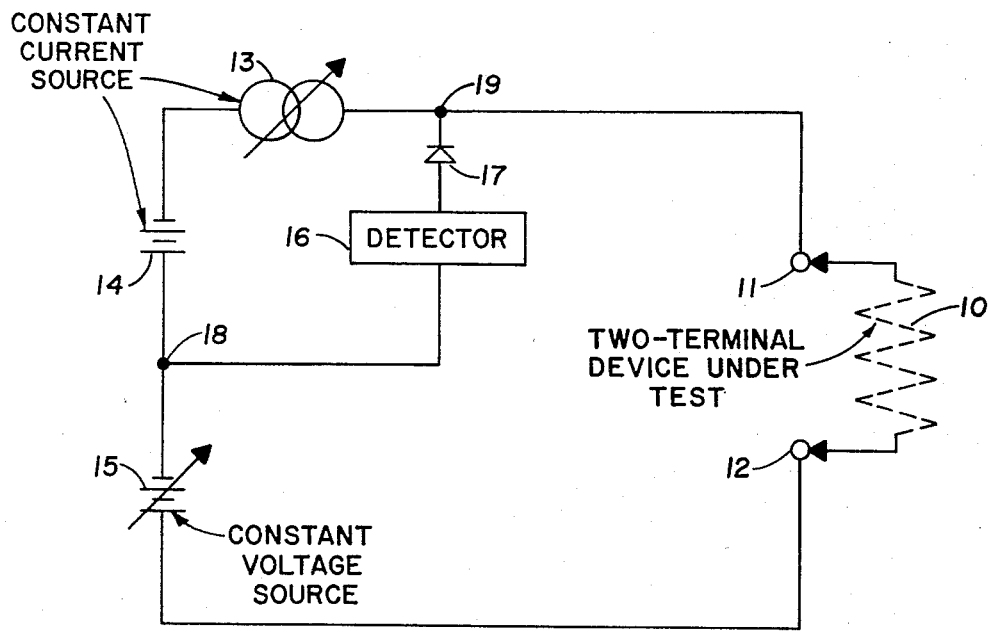
Howard Clay Dillon
INVENTOR.
BY *John D. Graham*
ATTORNEY

United States Patent Office 3,358,232
Patented Dec. 12, 1967

---

3,358,232
CURRENT AND VOLTAGE REGULATED TESTING APPARATUS FOR MEASURING THE IMPEDANCE CHARACTERISTICS OF COMPONENTS
Howard C. Dillon, Dallas, Tex., assignor to Texas Instruments Incorporated, Dallas, Tex., a corporation of Delaware
Filed Oct. 5, 1962, Ser. No. 228,650
2 Claims. (Cl. 324—158)

This invention relates to electrical test equipment, and more particularly to a system for measuring the impedance characteristics of components such as transistors or diodes.

In the production of electrical components it is necessary to test certain electrical parameters of the components at various stages for the purposes of quality control and classification of the finished product. For mass production it is best that the testing apparatus provide a "binary" or accept-reject output rather than requiring the machine operator to make a decision. The component under test must not be subjected to excess voltage or current.

For example, two common types of tests on a semiconductor diode, or on the base-emitter terminals of a transistor, are breakdown voltage as measured with an applied reverse current and leakage current as measured with an applied reverse voltage. In each case it is desirable to limit the measured quantity to a posible excursion that exceeds the specified value by as little as possible and still provide accurate measurement. In general, prior art systems use a specific bias quantity to provide for measurement as required, and in addition provide for excursion limitation more or less independent of the measurement functions.

It is the principal object of this invention to provide improved test equipment for measuring and classifying voltage-current parameters of electrical components. Another object is to provide a classification detector, for components such as transistors or diodes, which has a binary type output and is adapted for mass production use. An additional object is to provide apparatus for testing electrical components without exceeding upper limits for current or voltage.

In accordance with this invention, a two-terminal device to be tested is connected across a series combination of an adjustable current regulator or constant current source and an adjustable voltage regulator or constant voltage source. A detector having unidirectional conductive characteristics shunts the current source. Under these conditions, if the device under test will not pass the current required by the current regulator, this current will flow through the detector path. On the other hand, if the device will pass the specified current with the set voltage across it, no current will flow through the detector. Depending upon what information about the characteristics of the device is desired, the presence or absence of current through the detector can actuate a two-condition readout. With this arrangement, the current through the device under test cannot exceed that set by the current regulator, and the voltage across the device never exceeds that applied by the constant voltage source plus the drop across the detector arrangement. At the same time, the voltage and current are at levels adequate for a distinct condition of the detector for any value of impedance of the tested device.

The novel features which are believed to be characteristic of the invention are set forth in the appended claims. The invention itself, however, will best be understood from the following detailed description of an illustrative embodiment, when read in conjunction with the accompanying drawing, wherein:

The single figure is a block diagram of electrical test equipment incorporating the principles of the invention.

With reference to the figure, a two-terminal device 10 which is to be tested is connected across a pair of test terminals 11 and 12. The device 10 under test may be a semiconductor diode or the base and emitter electrodes of a transistor, for example. Of course, any passive, nonreactive component or network may be tested in this manner. The test terminal 11 is connected to one side of a current regulator 13 which is adapted to prevent more than a selected current from passing therethrough. This current regulator is adjustable and is conventional in form. The current regulator is serially connected with a voltage supply 14 and these two devices function together to provide a constant current source. A battery in series with a large resistor provides a constant current source in a crude form, while various circuits using transistors or other active elements have been devised to provide this constant current function. An adjustable regulated voltage supply 15 connects the supply 14 to the test terminal 12. This supply 15 is conventional in form and functions to apply a selected voltage in the circuit as shown. A detector 16 and a series diode 17 as hereinafter provided are connected from a juncture 18 between the sources 14 and 15 to a juncture 19 between the current source 13 and the terminal 11. The series diode 17 is protective, for short circuit load conditions, of the detector 16 and need not be used (i.e., a short circuit used in its stead) when the expected range of adjustment of the constant voltage source 15 does not exceed the reverse-voltage input rating of the detector 16. The detector may be a low-input-impedance transistor amplifier circuit driving a relay, with a lamp or other indicating means in the relay circuit. If diode 17 is not used, the detector 16 should have a diode input impedance characteristic such that no reverse current flows from the detector 16 through the load 10 when such load 10 is lower in resistance value than a threshold value hereafter described.

The operation of the testing circuit described above may be understood by considering the response of the circuit for various values of the apparent resistance of the device 10. Assuming that the device under test presents an infinitely large resistance to the terminals 11 and 12, no current can flow through the device 10 or the voltage supply 15. All of the current from the current source (considering the current regulator 13 and the supply 14 together as a constant current source) will be shunted through the detector 16 and the diode 17. The detector will thus be actuated. The voltage applied to the terminals 11 and 12 in this situation will be merely the value set by the supply 15 plus the forward voltage drop across the diode 17 and the drop across the base-emitter diode of the detector input transistor. The sum of the two latter values would be less than about one volt, and so there would be no possibility of destroying the tested device by overvoltage.

At the other extreme, assuming that the resistance of the device 10 is infinitely small, a short circuit, then the current flow path is in the outside loop through the voltage supply 15 and the device 10 back through the current regulator. No current flows through the detector 16 due to the diode 17 and the low impedance of the supply 15 and device 10. Thus the detector indicator is not actuated. The current through the device 10 cannot exceed the value set by the regulator 13, and so the maximum allowable value of current through the device need not be exceeded.

Considering now the critical operating range, assume a value for the resistance of the device 10 that will allow virtually all of the current output of the source 14 and the regulator 13 to flow through the supply 15 and the device 10, while just enough current flows through the detector to keep it actuated. At this threshold, the voltage drop between the junctures 18 and 19 is still only a volt or less, so an excess voltage is not applied to the device under test. On the other hand, if the impedance of the device 10 is slightly less than the condition just described, the detector circuit will be released, but the voltage drop across the device will change only by the previous drop across the detector. A good measure of the sensitivity of a measuring circuit of this type is the ratio of the resistance of the device on either side of the threshold to the difference between these two values of resistance. With the circuit described above, sensitivities of 100 have been obtained at a two volt bias level, higher voltages giving higher sensitivities.

While the invention has been described with reference to a specific embodiment, this description is merely illustrative of the principles involved and is not meant to be construed in a limiting sense. Various modifications of the illustrated embodiment, as well as other embodiments of the invention, will be obvious to persons skilled in the art when reading this description. Accordingly, it is contemplated that the appended claims will be interpreted to cover any such modifications or embodiments as fall within the true scope of the invention.

What is claimed is:

1. In apparatus for testing semiconductor devices:
   (a) a pair of terminals for connection to two terminals of a semiconductor device which is to be tested,
   (b) a regulated voltage source adjustable in magnitude,
   (c) an adjustable constant current source,
   (d) means connecting the voltage source and the current source in series between the pair of test terminals with the two sources being poled in the same direction,
   (e) detector means having a low input impedance detecting current flow in its input above a small threshold level and indicating the presence thereof.
   (f) a diode having a low forward voltage drop,
   (g) and means connecting the detector means and the diode in series across the current source with the diode permitting current flow through the detector means from the current source but preventing current flow through the detector means from the voltage source.

2. In testing apparatus:
   (a) a pair of terminals for connection to two terminals of an electrical component which is to be tested,
   (b) a voltage source adjustable in magnitude,
   (c) a constant current source adjustable in magnitude,
   (d) means connecting the voltage source and the current source in series between the pair of test terminals with the sources being poled in the same direction,
   (e) detector means having an input,
   (f) unidirectionally conductive means,
   (g) and means connecting the input of the detector means and the unidirectionally conductive means in series across the current source, the unidirectionally conductive means permitting current flow through the detector means from the current source but opposing current flow through the detector means from the voltage source,
   (h) the detector means providing an indication of the presence of current in said input above a small threshold level.

References Cited

UNITED STATES PATENTS

| | | | |
|---|---|---|---|
| 2,895,106 | 7/1959 | Taunt | 324—158.2 |
| 2,934,705 | 4/1960 | Stetzler | 324—158.2 |
| 2,999,983 | 9/1961 | Stern et al. | 324—158.2 |

OTHER REFERENCES

Army Technical Manual TM 11-690, March 1959, No. 690, pps. 99, 100.

Crystal Diode Circuit Kinks (Sylvania), 1952, pages 3, 4.

RUDOLPH V. ROLINEC, *Primary Examiner.*

WALTER L. CARLSON, *Examiner.*

E. L. STOLARUN, *Assistant Examiner.*